(12) United States Patent  
Morin et al.

(10) Patent No.: US 9,272,255 B2  
(45) Date of Patent: Mar. 1, 2016

(54) COMBUSTION DEVICE THAT PRODUCES HYDROGEN WITH THE RE-USE OF CAPTURED CO2

(75) Inventors: Jean-Xavier Morin, Neuville aux Bois (FR); Corinne Beal, Voisins le Bretonneux (FR); Silvestre Suraniti, Aix en Provence (FR)

(73) Assignee: ALSTOM Technology Ltd, Baden (CH)

( * ) Notice: Subject to any disclaimer, the term of this patent is extended or adjusted under 35 U.S.C. 154(b) by 1320 days.

(21) Appl. No.: 11/886,135

(22) PCT Filed: Mar. 29, 2006

(86) PCT No.: PCT/FR2006/050271  
§ 371 (c)(1),  
(2), (4) Date: Sep. 11, 2007

(87) PCT Pub. No.: WO2006/103370  
PCT Pub. Date: Oct. 5, 2006

(65) Prior Publication Data  
US 2008/0193349 A1     Aug. 14, 2008

(30) Foreign Application Priority Data  
Apr. 1, 2005 (FR) .................................... 05 50858

(51) Int. Cl.  
*B01J 8/24*     (2006.01)  
*B01J 8/06*     (2006.01)  
(Continued)

(52) U.S. Cl.  
CPC ................. *B01J 8/067* (2013.01); *C01B 3/384* (2013.01); *C01B 3/48* (2013.01); *F23C 10/10* (2013.01); *F23C 13/00* (2013.01); *F23C 99/00* (2013.01); *F23L 7/007* (2013.01);  
(Continued)

(58) Field of Classification Search  
USPC ........... 48/127.9, 61; 422/187, 188, 198, 211, 422/201  
See application file for complete search history.

(56) References Cited

U.S. PATENT DOCUMENTS 24,328 A * 6/1859 Jacolev et al. .................. 34/647  
2,606,826 A * 8/1952 Jacolev et al. ............... 48/198.3

(Continued)

FOREIGN PATENT DOCUMENTS

| | | |
|---|---|---|
| DE | 2711991 | 9/1978 |
| DE | 4308803 | 9/1994 |
| FR | 2850156 | 7/2004 |

OTHER PUBLICATIONS

PCT International Search Report (PCT/FR2006/050271).

*Primary Examiner* — Kaity Handal  
(74) *Attorney, Agent, or Firm* — Robert D. Crawford (57) ABSTRACT

The combustion device according to the invention produces gases containing $CO_2$ and water vapor and comprises a circulating fluidized bed reaction chamber (1, 2), a separator (10, 20), heat recovery means of which a part is situated in a dense fluidized bed (12, 12a, 22), wherein the part located in the bed of the heat recovery system(s) is composed of catalyst tubes (120, 120a, 220) through which a gas mixture flows. The gas mixture is composed of natural gas and/or naphtha or refinery gas or two or more of these gases. The gas undergoes reformation which converts it into a synthesis gas containing hydrogen. The fact of the catalyst tubes being situated in the dense fluidized bed made up of ashes from the combustion allows the catalyst to be reheated in a homogenous manner and the reforming reaction of the natural gas mixture to be stimulated.

24 Claims, 6 Drawing Sheets

(51) Int. Cl.
*C01B 3/38* (2006.01)
*C01B 3/48* (2006.01)
*F23C 10/10* (2006.01)
*F23C 13/00* (2006.01)
*F23C 99/00* (2006.01)
*F23L 7/00* (2006.01)

(52) U.S. Cl.
CPC ............ *B01J 2208/0053* (2013.01); *B01J 2208/00176* (2013.01); *B01J 2208/00212* (2013.01); *B01J 2208/00309* (2013.01); *B01J 2219/00006* (2013.01); *C01B 2203/0233* (2013.01); *C01B 2203/0238* (2013.01); *C01B 2203/0283* (2013.01); *C01B 2203/0805* (2013.01); *C01B 2203/0838* (2013.01); *C01B 2203/1241* (2013.01); *F23C 2900/03002* (2013.01); *F23C 2900/99008* (2013.01); *Y02E 20/322* (2013.01); *Y02E 20/344* (2013.01); *Y02E 20/346* (2013.01)

(56) References Cited

U.S. PATENT DOCUMENTS

| | | | |
|---|---|---|---|
| 4,372,755 A * | 2/1983 | Tolman et al. | 48/197 R |
| 5,439,504 A * | 8/1995 | Czermak et al. | 75/444 |
| 5,478,370 A | 12/1995 | Spangler | |
| 5,578,092 A * | 11/1996 | Collin | 44/620 |
| 5,674,308 A * | 10/1997 | Meissner et al. | 75/450 |
| 6,494,153 B1 | 12/2002 | Lyon | |
| 6,505,567 B1 | 1/2003 | Anderson et al. | |
| 2005/0287053 A1* | 12/2005 | Sakai et al. | 422/196 |
| 2008/0302013 A1* | 12/2008 | Repasky et al. | 48/127.9 |

* cited by examiner

COMBUSTION DEVICE THAT PRODUCES HYDROGEN WITH THE RE-USE OF CAPTURED CO2

BACKGROUND OF THE INVENTION

The present invention concerns power stations that use fossil fuels. Such power stations produce large quantities of greenhouse gases, notably $CO_2$, which it is necessary to control.

These pressures make it necessary to resolve, in an economic fashion and with minimum impact, new problems such as the capture of $CO_2$ from power station flue gases including by the use of renewable energy of the biomass type, non-fossil carbon for example.

Moreover, the growing prospect of the imminent exhaustion of petroleum resources and the requirement to find a replacement for them for vehicle transport, also an important source of $CO_2$ emissions, leads to the search for alternative solutions for the production of substitute fuels, in particular from non-fossil (biomass) fuels.

On the other hand, at night, the electricity production resources are scarcely used, a fact which is an incentive in the development of polygeneration type production facilities.

In order to reduce pollution, the method is known of converting combustible solids containing carbonaceous matter to oxygen diluted from recycled $CO_2$, rather than to air, so as to produce gases which do not contain nitrogen. The method is also known of converting combustible solids by combustion in a thermochemical cycle in order to produce gases without nitrogen. However, these methods only produce electricity and are, thus, underutilized when production falls.

In order to produce a gas rich in hydrogen, particularly intended to be used by fuel cells and for the production of transport fuels, the method is known of reforming natural gas within catalyst tube bundles which are partially immersed in a dense fluidized bed. However, these systems use fuels for the purpose of heating the bed and water vapour to produce a synthesis gas rich in hydrogen.

SUMMARY OF THE INVENTION

The aim of the invention is to propose an energy conversion device which produces electricity and a hydrogen enriched synthesis gas at the same time, on the other hand with minimum water vapour intake and without additional fuel.

The combustion device according to the invention produces gases containing $CO_2$ and water vapour and comprises a circulating fluidized bed reaction chamber, a separator, a heat recovery system of which a part is positioned in a dense fluidized bed, wherein the part located in the bed of the heat recovery system(s) is composed of catalyst tubes through which a gas mixture flows. The gas introduced is made up of natural gas and/or naphtha or refinery gas or two or more of these gases, this gas will be designated as "gas to be reformed". The gas undergoes reforming which transforms it into synthesis gas containing hydrogen. The fact of the catalyst tubes being located in the dense fluidized bed made up of combustion residues allows reheating of the catalyst in a homogeneous manner and the reforming reaction of the gas mixture to be stimulated.

$CO_2$ recycled from combustion gases is used for mixing with the gas to be reformed and to introduce it into the catalyst tubes. In fact, the combustion of solid fuels with a carbonaceous content produces $CO_2$, which may be used for the reforming of the gas mixture according to the following formulae:

$$CH_4 + 2CO_2 \rightarrow 3CO + H_2 + H_2O$$

$$CH_4 + 3CO_2 \rightarrow 4CO + 2H_2O.$$

This last reaction incorporates a maximum of $CO_2$ in comparison with $CH_4$, which allows the quantity of $CH_4$ used to be minimised and to achieve an optimum $CO/H_2$ mixture. Reforming of the gas mixture is thus carried out by a combination of the reactions with the $CO_2$ and the water vapour.

The water vapour present in the gases from the combustion of solid carbonaceous fuels recycled in catalyst tubes is also used. Reforming of the gas mixture is carried out in accordance with the following formulae:

$$CH_4 + 2H_2O \rightarrow CO_2 + 4H_2$$

$$CH_4 + H_2O \rightarrow CO + 3H_2.$$

After the catalyst tubes the synthesis gas goes to the hydrogen production facilities which comprise a gas to water reaction stage which further increases the hydrogen content. This stage is characterised by the following reaction:

$$CO + H_2O \rightarrow CO_2 + H_2$$

This gas to water reaction is of particular interest since it allows, by using the water vapour produced by the combustion, supplemented if necessary by the required CO conversion rate in order to arrive at a certain C/H ratio in the synthesis gas, for the complete conversion of the CO produced into $CO_2$ and $H_2$ before subsequent separation of the $CO_2$ and of the hydrogen.

According to an initial variant, the combustion is combustion in air, i.e. the solid fuel is burned in air, thus the gases mainly comprise $CO_2$ diluted in nitrogen.

According to a second variant, the combustion is combustion in oxygen, the fuel is burned with oxygen produced or not by the device. In this case the gases include only of traces of nitrogen, the mixture is made up of about 75% of $CO_2$ and 25% of $H_2O$.

According to a third variant, the combustion is combustion in a thermochemical cycle, i.e. combustion takes place thanks to a metallic oxide which is successively oxidised in an oxidation reactor and reduces in the combustion chamber. The gases produced by the combustion comprise 55% $CO_2$ and 45% $H_2O$.

Combustion in a thermochemical cycle uses a metallic oxide for the transfer of oxygen.

The metallic oxide used in the thermochemical combustion cycle is used as a catalyst within the hydrogen production facilities. Thus, it is not necessary to introduce any additional catalyst into the device.

This metal oxide is an oxide of iron. This catalyst operates at 700/950° C.

In order to react with the gas mixture, the catalyst tubes are made in part of nickel oxide. This catalyst must be at 750/950° C. to react, it is reheated in the fluidized bed of which the temperature is about 750 to 950° C.

The gas flowing through the catalyst tubes is under pressure. This allows the reactor volume to be reduced and consequently the tube volumes and compensates for voltage losses.

The dense bed is preferably placed outside the combustion chamber. This improves the adaption flexibility of the device with regards to the production of synthesis gas thanks to a bed of larger size.

As a variant, the dense bed is placed along the walls of the reaction chamber. In this way the tubes are situated around the perimeter at the bottom of the chamber. Thus it is possible to have available additional tube reforming surfaces. In this case, feeding of the fluidized bed which contains the reforming tubes is carried out by descending solids collected along the walls of the combustion chamber, which permits an increase in overall installation performance when it is partly charged and a reduction in its minimum charge. This configuration is particularly advantageous since there is no longer the requirement to resort solely to solids which have been drawn off from an external supply the quantity of which varies widely according to the loading of the combustion chamber, in particular at low loading.

At least a part of the catalyst tubes is situated in the solids. The use of particulates to reheat the catalyst gives a better yield since the solids ensure better thermal wetting of the tubes. The usage of solids rather than of gas for heat exchanges allows a smaller reforming surface to be used, consequently less tubes and a more compact bed are required. The possible adjustment of the flow of solids feeding the dense bed allows adjustment of the temperature of the tubes and thus of the reforming kinetics.

A part of the catalyst tubes is situated above the solids. This allows an increase in the surface area of the available tubes.

According to one variant, a part of the tubes is situated on the bottom of the reaction chamber. Placing the reforming tubes on the bottom of the chamber is possible since the rigidity of the bottom reduces the mechanical stresses on the tubes which can then be of great length.

The catalyst tubes are made of tubes of great length supported by intermediate plates. In the dense bed temporary plates are available to support the long reforming tubes.

According to one variant, the intermediate plates are cooled. In this way, it is possible to guarantee the durability of the tubes.

According to one variant, the catalyst tubes are made up of short tubes with intermediate chambers. In this case, the tubes may be laid out in series or in parallel.

BRIEF DESCRIPTION OF THE DRAWINGS

It will be easier to understand the invention by reading the description which follows, provided solely by way of example and drawn up by referring to the drawings appended, in which.

DETAILED DESCRIPTION OF THE PREFERRED EMBODIMENT

Figure 1:
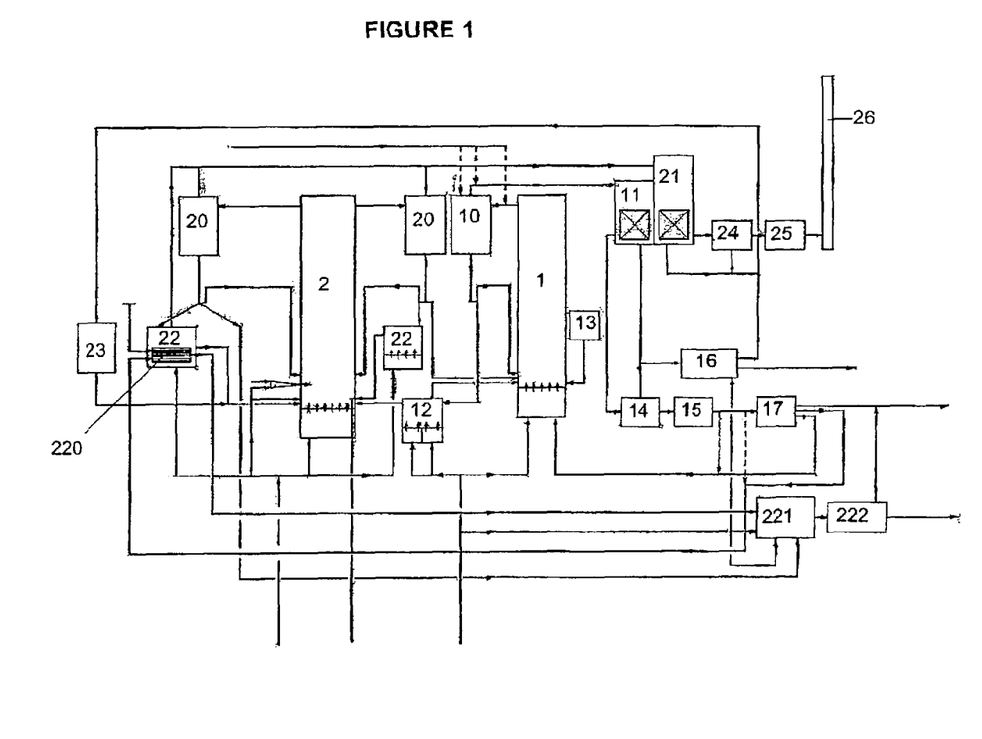
FIG. 1 is a general view of a first variant of the device according to the invention in a thermochemical cycle.

The device shown in FIG. 1 is a thermochemical cycle combustion device. It comprises a combustion chamber 1 and an oxidation chamber 2.

The combustion chamber 1 has a cyclone 10 for the separation of solids which is, on the one hand, linked to a rear passage 11 and, on the other hand, to an external bed 12. Chamber 1 is fed with fuel from a silo 13. A filter bag 14, a fan 15, and a recovery unit for ashes and oxides 16 and a CO2 treatment station 17[1].

[1] This sentence has no verb as per French original.

The oxidation chamber 2 has two cyclones 20 linked, on the one hand, to a rear passage 21 and, on the other hand, to an external bed 22. Chamber 2 is fed by a silo 23. A filter bag 24, an exhaust fan 25 and a chimney 26 are positioned after the rear passage 21.

In parallel, a gas mixture, of recycled $CO_2$ and of water vapour, particularly contained in the recycled $CO_2$ is introduced into catalyst tubes 220 in bed 22 where reforming of the gas takes place. The gaseous mixture composed of CO, $H_2$, $CO_2$ and $H_2O$. which exits is then sent to a gas to water reactor 221 then a hydrogen purification device 222. Purification 222 is carried out by means of solvent, membranes or cryogenics. The gas leaving the reactor 221 is composed of $H_2$, $CO_2$ and $H_2O$.

A metallic oxide circulates from the oxidation chamber 2 where it is oxidised then separated from the gases in the cyclone 20, an initial portion goes into the combustion chamber 1 where it is reduced, a second portion returns to the chamber 2, a third portion goes into the external fluidized bed 22 where the temperature is controlled and returns to the chamber 2, a fourth portion goes to the reactor 221 where it acts as a catalyst for the gas to water reaction.

Figure 2:
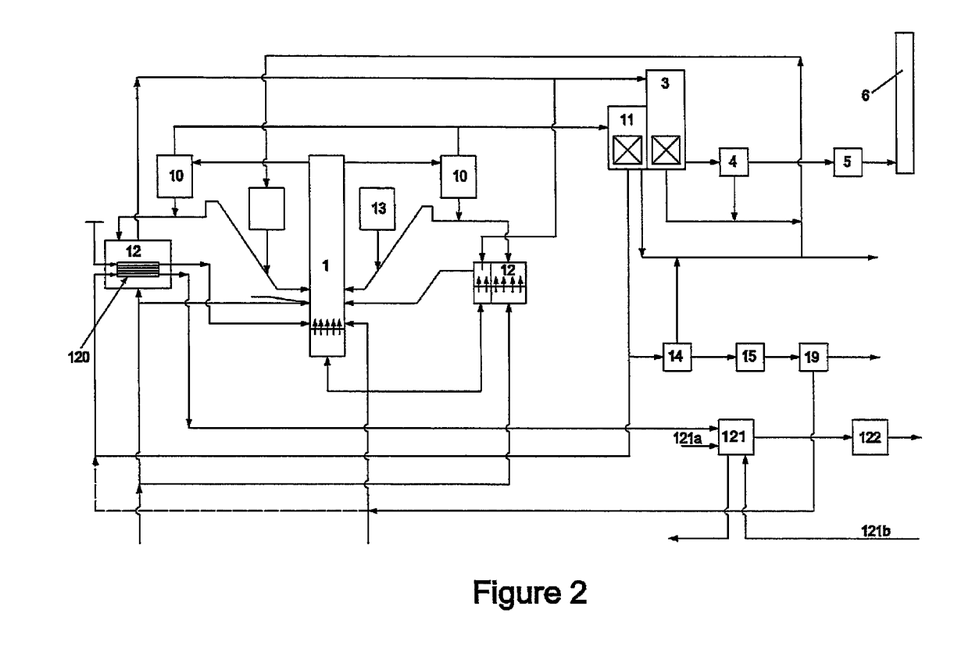
FIG. 2 is a general view of a second variant of the device according to the invention with combustion in oxygen.

The device presented in FIG. 2 is a device for combustion in oxygen in a circulating fluidized bed. It comprises a combustion chamber 1, one or more separators 10 linked to a rear passage 11 and one or more fluidized beds 12. The gases emanating from the rear passage 11 are transferred to a filter bag 14, a fan 15 then a condenser 19 before the $CO_2$ compression train (not shown).

The bed 12 is fluidized by external air which is then cooled in a separate rear passage 3, then a filter bag 4, a ventilator 5 and a chimney 6.

The bed 12 contains catalyst tubes 120 through which flows a mixture of recycled gas and $CO_2/H_2O$ coming from the combustion and leaving by the rear passage 11. Some residual oxygen (less than 5%) remains in the recycled $CO_2/H_2O$ and contributes to the partial oxidation of the synthesis gas produced and encourages it to react by an increase in temperature of the synthesis gas independently from the temperature of the solids. The synthesis gas is transferred to a gas to water reaction device 121 then a hydrogen purifier 122. The reaction device 121 is fed with catalyst from outside by means of conduit 121a and with vapour by means of conduit 121b.

Figure 3:
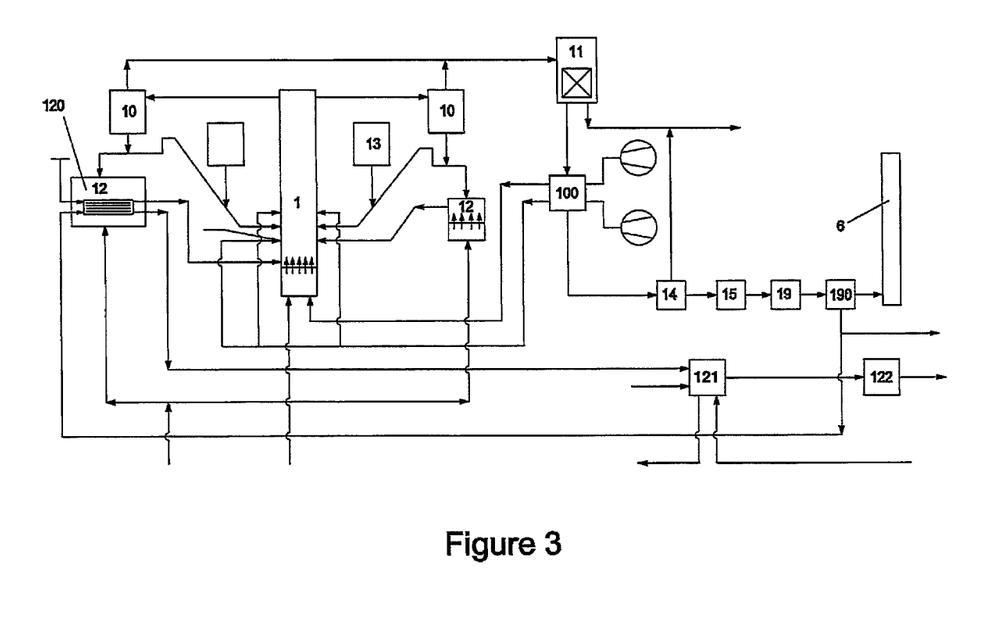
FIG. 3 is a general view of a third variant of the device according to the invention with combustion in air.

It is possible to use a standard air combustion device with $CO_2$ capture by washing with amines as shown in FIG. 3. Washing with amines is a standard technique for the separation of $CO_2$ from other gases emanating from combustion such as, mainly, nitrogen. The device comprises a combustion chamber 1 linked to one or more separators 10. Each separator 10 is linked to an external fluidized bed 12 and to a return to the chamber 1. The bed 12 is fluidized by air.

The gases emanating from the separator go to a rear passage 11 where they are cooled, the remaining heat serves to reheat the air entering the chamber 1 in an air heater 100. As in the case of the previous variants, the gases then go to a filter bag 14, a ventilator 15 then a condenser 19 and an amine washer 190. The $CO_2/H_2O$ is extracted from the gases which are then returned to atmosphere via a chimney 6.

In the bed 12 catalyst tubes 120 have been placed in which a gas mixture circulates. The $CO_2/H_2O$ extracted is sent into the tubes 120 with a gas mixture in order to carry out reforming of the latter. The gases obtained go to a gas to water reaction device 121 into which catalysts 121*a* and water vapour 121*b* are introduced. Purification of the gas is carried out in a purifier 122 in order to increase its hydrogen content.

Figure 3A:
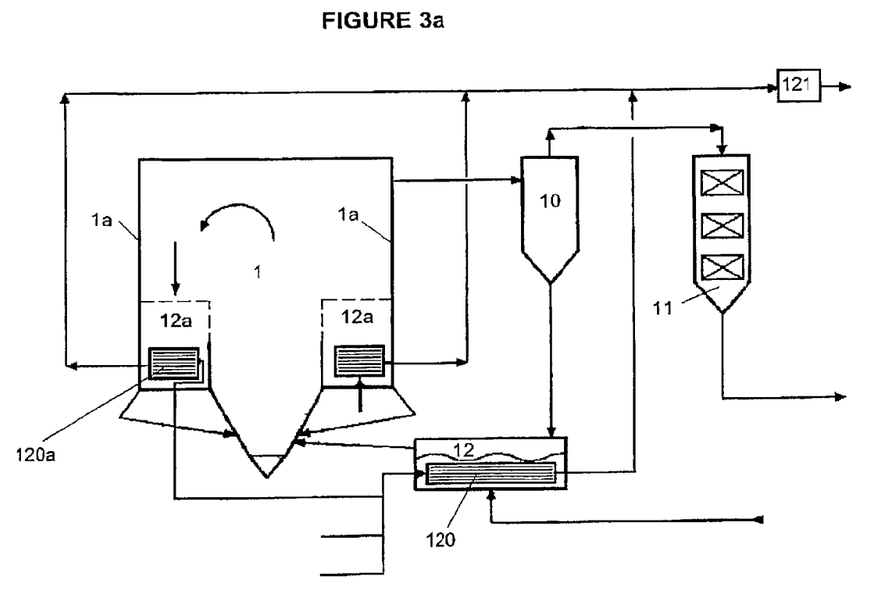
FIG. 3a is a general view of a variation of the third variant of the device in FIG. 3.

In the variant shown in FIG. 3*a*, a bed 12*a* is placed along the walls 1*a* of the chamber 1. As opposed to bed 12, this bed 12*a* is fed with solids by descending particulates collected along the wall 1*a* of the chamber 1. It is fluidized by air.

The gas mixture arrives at the level of each bed 12 and 12*a* in catalyst tubes 120 positioned in the bed 12 and 120*a* in the bed 12*a*. Once reforming has taken place the gases go towards the gas to water reaction device 121.

Figure 4:
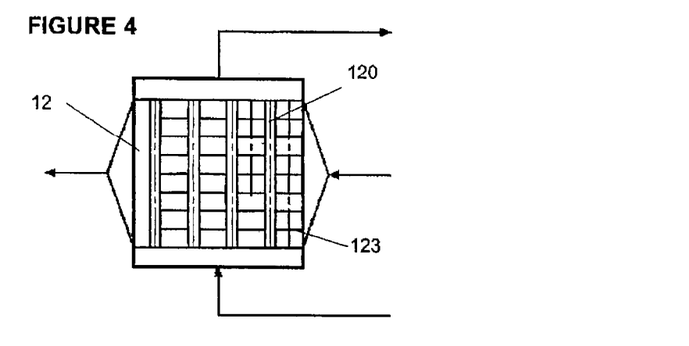
FIG. 4 is a view of the top of the bed according to a first variant of the bed.

FIG. 4 shows long catalyst tubes 120 situated in the bed 12 and supported by intermediate plates 123.

Figure 5:
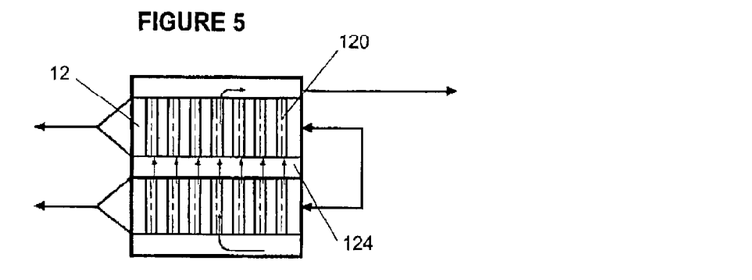
FIG. 5 is a view of the top of the bed according to a second variant of the bed.

FIG. 5 shows a bed 12 with short catalyst tubes 120 in parallel with intermediate chambers 124. The gas mixture arrives at the bottom and leaves at the top in FIG. 5.

Figure 6:
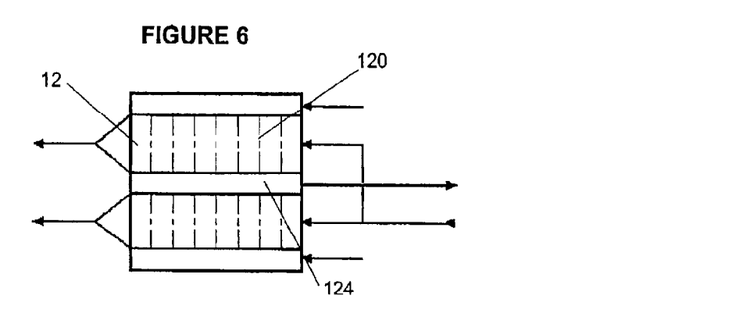
FIG. 6 is a view of the top of the bed according to a third variant of the bed.

FIG. 6 shows a bed 12 with short catalyst tubes 120 in series with intermediate chambers 124. The gas mixture arrives at the top and the bottom and leaves from the middle in FIG. 6.

Figure 7:
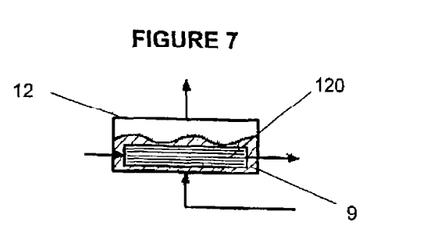
FIG. 7 is a cross-section view of the bed according to a first arrangement of the catalyst tubes.

FIG. 7 shows catalyst tubes 120 placed in the solids 9.

Figure 8:
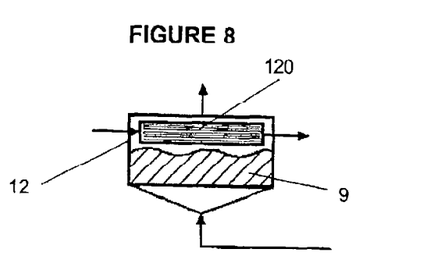
FIG. 8 is a cross-section view of the bed according to a second arrangement of the catalyst tubes.

FIG. 8 shows catalyst tubes 120 placed on top of the solids 9.

Figure 9:
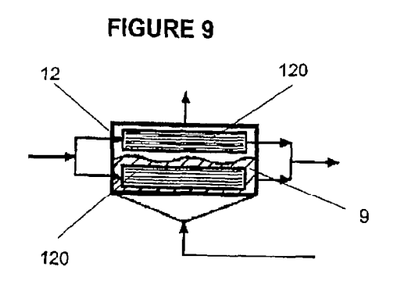
FIG. 9 is a cross-section view of the bed according to a third arrangement of the catalyst tubes.

FIG. 9 shows catalyst tubes 120 placed in the solids 9 and tubes 120 on top of the solids 9.

The invention claimed is:

1. A gas producing device that reforms a gas mixture; said device comprising:
    a circulating fluidized bed chamber having a bottom and a plurality of walls, wherein the circulating fluidized bed chamber produces an exhaust gas having heated solids therewith;
    a separator that receives the exhaust gas with the heated solids and separates a portion of the heated solids from the exhaust gas;
    a heat recovery chamber then receives the separated, heated solids from said separator to form a fluidized bed of heated solids therein; and
    a plurality of catalyst tubes disposed within the heat recovery chamber in thermal communication with the fluidized bed of heated solids for transferring heat from the heated solids to the plurality of catalyst tubes, and wherein the plurality of catalyst tubes and configured to receive and reform a gas mixture.

2. The gas producing device as claimed in claim 1, further comprising a hydrogen conversion device including a gas to water reaction stage, the hydrogen conversion device configured to receive the reformed gas mixture.

3. The gas producing device as claimed in claim 2, wherein a metal oxide is utilized as a catalyst in said hydrogen conversion device.

4. The gas producing device as claimed in claim 1, further comprising a combustion chamber in fluid communication with the circulating fluidized bed chamber, wherein combustion occurs therein in the presence of air.

5. The gas producing device as claimed in claim 1, further comprising a combustion chamber in fluid communication with the circulating fluidized bed chamber, wherein combustion occurs therein in the presence of oxygen.

6. The gas producing device as claimed in claim 1, further comprising a combustion chamber in fluid communication with the circulating fluidized bed chamber, wherein combustion occurs therein during a thermochemical cycle.

7. The gas producing device as claimed in claim 6, further comprising a combustion chamber in fluid communication with the circulating fluidized bed chamber, wherein combustion occurs therein during a thermochemical cycle in which a metal oxide is employed.

8. The gas producing device as claimed in claim 7, wherein said metal oxide is an oxide of iron.

9. The gas producing device as claimed in claim 1, wherein said catalyst tubes comprise nickel oxide.

10. The gas producing device as claimed in claim 1, wherein the gas mixture is under pressure during the passage thereof through said catalyst tubes.

11. The gas producing device as claimed in claim 1, wherein said heat recovery chamber is located outside of said circulating fluidized bed chamber.

12. The gas producing device as claimed in claim 1, wherein said heat recovery chamber is located within and in juxtaposed relation to at least one of said plurality of walls of said circulating fluidized bed chamber.

13. The gas producing device as claimed in claim 12, wherein at least a portion of said plurality of catalyst tubes is disposed on said bottom of said circulating fluidized bed chamber.

14. The gas producing device as claimed in claim 1, wherein at least a portion of said plurality of catalyst tubes is disposed in said fluidized bed of heated solids within the heat recovery chamber.

15. The gas producing device as claimed in claim 1, wherein at least a portion of said plurality of catalyst tubes is disposed above said fluidized bed of solids within the heat recovery chamber.

16. The gas producing device as claimed in claim 1, wherein said plurality of catalyst tubes comprise a plurality of long tubes supported by intermediate plates.

17. The gas producing device as claimed in claim 16, wherein said intermediate plates are cooled.

18. The gas producing device as claimed in claim 1, wherein said plurality of catalyst tubes comprise a plurality of short tubes having intermediate chambers interposed therewith.

19. The gas producing device as claimed in claim 1, further comprising a combustion chamber in fluid communication with the circulating fluidized bed chamber,
    wherein the combustion chamber includes a second circulating fluidized bed chamber.

20. The gas producing device as claimed in claim 19, comprising a duct to provide $CO_2$ from combustion gases of the combustion chamber to the plurality of catalyst tubes to be reformed as the $CO_2$ passes through the plurality of catalyst tubes.

21. The gas producing device as claimed in claim 20, wherein water vapor from the combustion gases of the combustion chamber is provided to the plurality of catalyst tubes via the duct.

22. The gas producing device as claimed in claim 1, further comprising a duct to recycle at least a portion of the heated solids of the heat recovery chamber to the circulating fluidized bed chamber.

23. The gas producing device as claimed in claim 1, wherein the heat recovery chamber is disposed within the circulating fluidized bed chamber and the heated solids of the heat recovery chamber are cycled between the heat recovery chamber and the circulating fluidized bed chamber.

24. The gas producing device as claimed in claim 1, wherein the gas mixture comprises methane, naphtha, refinery gas, or a combination thereof.

* * * * *